(12) United States Patent
Liu et al.

(10) Patent No.: US 11,750,087 B2
(45) Date of Patent: Sep. 5, 2023

(54) TOTEM POLE BRIDGELESS PFC POWER CONVERTERS

(71) Applicant: Astec International Limited, Kwun Tong (HK)

(72) Inventors: Jun Liu, Shen Zhen (CN); Guangqun Li, Shen Zhen (CN); Liren Wang, Shen Zhen (CN)

(73) Assignee: Astec International Limited, Kowloon (HK)

( * ) Notice: Subject to any disclaimer, the term of this patent is extended or adjusted under 35 U.S.C. 154(b) by 178 days.

(21) Appl. No.: 16/332,641

(22) PCT Filed: May 24, 2018

(86) PCT No.: PCT/CN2018/088253
§ 371 (c)(1),
(2) Date: Mar. 12, 2019

(87) PCT Pub. No.: WO2019/222965
PCT Pub. Date: Nov. 28, 2019

(65) Prior Publication Data
US 2020/0161962 A1  May 21, 2020

(51) Int. Cl.
*H02M 1/42* (2007.01)
*H02M 7/23* (2006.01)
*H02M 1/00* (2006.01)

(52) U.S. Cl.
CPC ....... *H02M 1/4208* (2013.01); *H02M 1/4266* (2013.01); *H02M 7/23* (2013.01); *H02M 1/0009* (2021.05); *H02M 1/0085* (2021.05); *H02M 1/4225* (2013.01)

(58) Field of Classification Search
CPC .......................... H02M 1/4225; H02M 1/4233
See application file for complete search history.

(56) References Cited

U.S. PATENT DOCUMENTS

| 2005/0105311 | A1* | 5/2005 | Soldano ............. | H02M 1/4225 |
| | | | | 363/89 |
| 2013/0257390 | A1 | 10/2013 | Jin et al. | |
| 2014/0043127 | A1* | 2/2014 | Worek ................... | H01F 27/38 |
| | | | | 336/178 |
| 2016/0241132 | A1* | 8/2016 | Lin ..................... | H02M 1/4225 |

(Continued)

FOREIGN PATENT DOCUMENTS

CN    205610494 U  *  9/2016

OTHER PUBLICATIONS

CN20561094, Sep. 2016 (English machine translation document) https://worldwide.espacenet.com/patent/search/family/056965650/publication/CN205610494U?q=pn%3DCN205610494U.*

(Continued)

*Primary Examiner* — Rafael O De Leon Domenech

(57) ABSTRACT

An electric power supply includes a totem pole bridgeless PFC power converter. The PFC power converter includes an input for coupling to an AC power source, an output, four switching devices coupled between the input and the output, two diodes coupled between the four switching devices and the input, a first inductor coupled between the four switching devices and the two diodes, and a second inductor coupled between the two diodes and the input. Other example electric power supplies and totem pole bridgeless PFC power converters are also disclosed.

15 Claims, 4 Drawing Sheets

(56) References Cited

U.S. PATENT DOCUMENTS

2017/0294833 A1* 10/2017 Yang .................. H01F 27/2804
2018/0027620 A1    1/2018 Lochmann et al.
2019/0319528 A1* 10/2019 Matsuura .............. H02M 7/219
2019/0319541 A1* 10/2019 Murakami .......... H02M 1/4233

OTHER PUBLICATIONS

Zhou et al., 99% Efficiency True-Bridgeless Totem-Pole PFC Based on GaN HEMTs, Transphorm, Inc., May 2017, 9 pages.
Salil Chellappan, "A comparative analysis of topologies for a bridgeless-boost PFC circuit", Analog Design Journal, ADJ 3Q 2018, pp. 1-5, https://www.ti.com/lit/an/slyt750/slyt750.pdf?ts=1618501324946.
Eka Firmansyah, "An Interleaved Totem-Pole Power Factor Correction Converter", Research Reports on Information Science and Electrical Engineering of Kyushu University, vol. 15, No. 1, Mar. 2010, pp. 1-6, https://citeseerx.ist.psu.edu/viewdoc/download?doi=10.1.1.1005.9323&rep=rep1&type=pdf.
Xun Gong, "98.6% Efficiency, 6.6-kW Totem-Pole PFC Reference Design for HEV/EV Onboard Charger", Mar. 2018—Revised Apr. 2020, pp. 1-71, https://www.ti.com/tool/TIDA-01604.

* cited by examiner

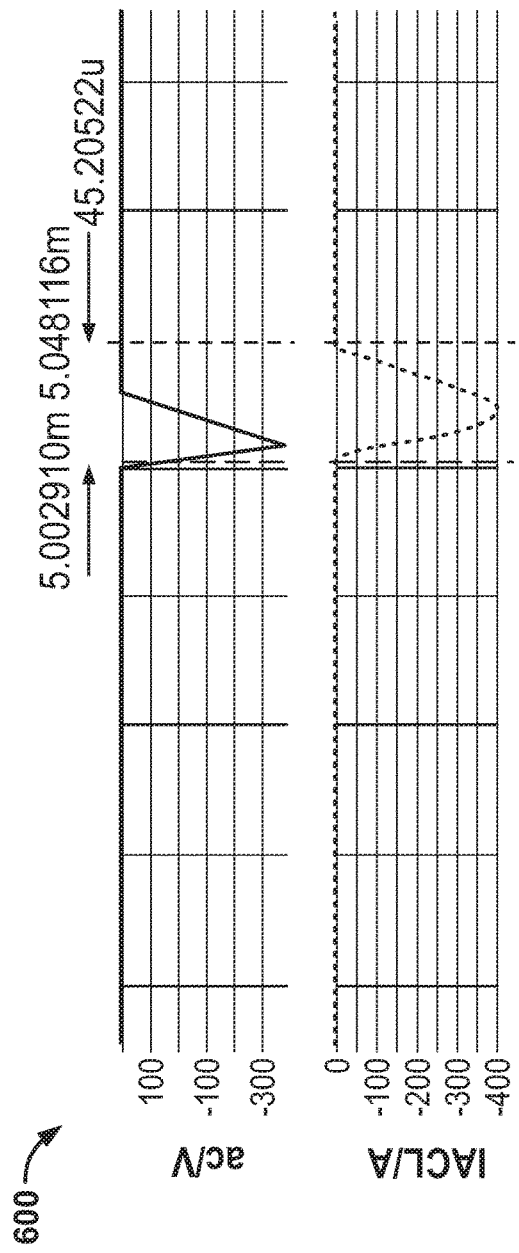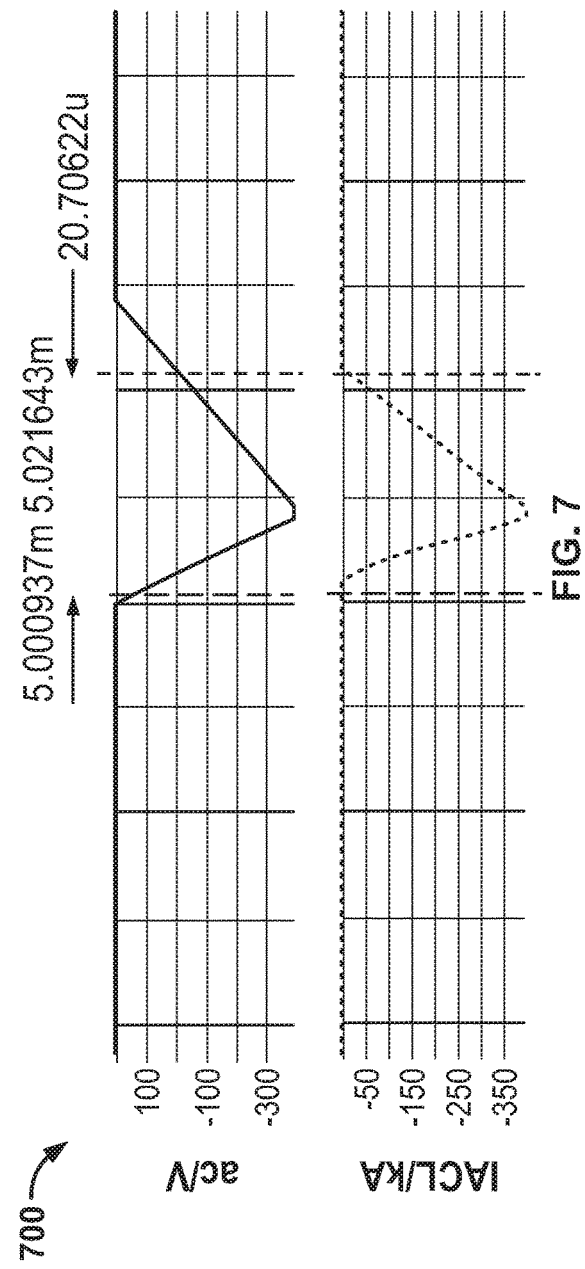

TOTEM POLE BRIDGELESS PFC POWER CONVERTERS

FIELD

The present disclosure relates to totem pole bridgeless power factor correction (PFC) power converters.

BACKGROUND

This section provides background information related to the present disclosure which is not necessarily prior art.

Electric power supplies commonly include PFC circuitry to correct a power factor in the power supplies. The power factor is the ratio of real power provided to a load and apparent power in a power supply. The power factor is corrected by making the AC input current of the power supply in phase with its AC input voltage.

The PFC circuitry may include passive correction circuitry and/or active correction circuitry. For example, the passive correction circuitry may include capacitors and/or inductors depending on the load (e.g., a capacitive load or an inductive load) coupled to the power supply. The active correction circuitry may form a PFC power converter such as a boost PFC converter. Commonly, the boost PFC converter includes a full-wave diode bridge rectifier and a boost power circuit. In other examples, the boost PFC converter may not include a diode bridge rectifier. In such examples, the boost PFC converter may have different boost converter topologies, including a totem-pole bridgeless PFC topology.

SUMMARY

This section provides a general summary of the disclosure, and is not a comprehensive disclosure of its full scope or all of its features.

According to one aspect of the present disclosure, an electric power supply includes a totem pole bridgeless PFC power converter. The PFC power converter includes an input for coupling to an AC power source, an output, four switching devices coupled between the input and the output, two diodes coupled between the four switching devices and the input, a first inductor coupled between the four switching devices and the two diodes, and a second inductor coupled between the two diodes and the input.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is a graph of voltage and current characteristics of the power converter of FIG. 5.

FIG. 7 is a graph of voltage and current characteristics of a power converter without split inductors.

Corresponding reference numerals indicate corresponding parts and/or features throughout the several views of the drawings.

DETAILED DESCRIPTION

Figure 1:
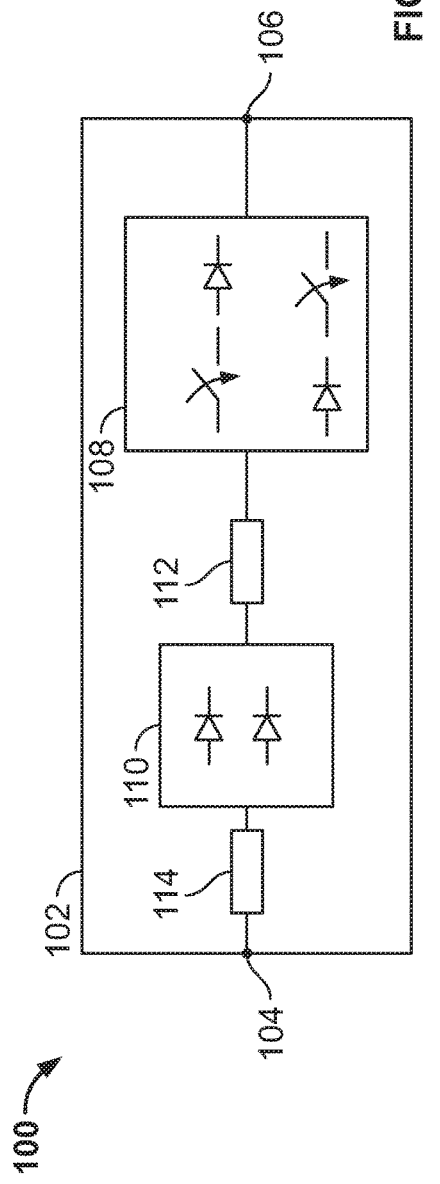
FIG. 1 is a block diagram of an electric power system including a totem pole bridgeless PFC power converter having split inductors and bypass diodes, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An electric power supply according to one example embodiment of the present disclosure is illustrated in FIG. 1 and indicated generally by reference number 100. As shown in FIG. 1, the electric power supply 100 includes a totem pole bridgeless PFC power converter 102 having an input 104 for coupling to an AC power source (not shown), an output 106, four switching devices 108 coupled between the input 104 and the output 106, two diodes 110 coupled between the four switching devices 108 and the input 104 and two inductors 112, 114. The inductor 112 is coupled between the switching devices 108 and the diodes 110, and the inductor 114 is coupled between the diodes 110 and the input 104.

The inductors 112, 114 may function as the PFC inductance in the totem pole bridgeless PFC power converter 102. For example, the inductors 112, 114 may be considered split inductors, with the inductor 114 coupled on the input side of the diodes 110 and the inductor 112 coupled on the output side of the diodes 110. In such examples, the inductor 114 may suppress undesired excessive current flowing through one or more of the switching devices 108 thereby reducing stress and deterioration on the switching devices 108 and/or other components in the power converter.

For instance, a negative surge voltage may be applied to the input of the of the power converter 102. This negative surge voltage may be caused by the polarity of a voltage supplied by the AC power source reversing. The negative surge voltage may generate a large amount of negative surge current in the power converter 102. As a result, the current flowing through the power converter 102 may significantly increase due to the negative surge current. This current passes through at least some of the switching devices 108 and diodes 110, and into the inductor 114 on the input side of the diodes 110 (e.g., on a return path back to the AC power source). This increased current generates a magnetic field (or a change in the magnetic field) in the inductor 114 which in turn induces an electromotive force (emf). The induced emf (a voltage) opposes the increased current thereby allowing the inductor 114 to dampen the increase in current caused by the negative surge voltage.

During this time, control of the switching devices 108 may be quickly altered (if necessary) in response to the excessive current. In some examples, control of the switching devices 108 may be altered after one switching pulse signal. This may equate to about a twenty microsecond (20 μsec) response time if the switching frequency is about fifty kilohertz (50 kHz). As such, the power converter 102 may be able to suppress excessive current with the inductor 114, and quickly alter control of its switching devices 108 to reduce stress and deterioration on the switching devices 108 and/or other components in the power converter.

The electric power supply 100 may include other components in addition to the components of the power converter 102. For example, the electric power supply 100 may include other power converters including one or more power switches, etc. coupled to the output 106 of the power converter 102. These power converters may include DC-DC power converters, DC-AC power converters, etc. having a suitable topology. Additionally, although not shown in FIG. 1, the power converter 102 and/or the electric power supply 100 may include one or more control circuits for controlling one or more of the switching devices 108.

The switching devices 108 of FIG. 1 are shown as including two switches and two diodes. Alternatively, the switching devices 108 may include four switches, three switches and one diode, etc. In some embodiments, the power switches each may include a transistor such as a field-effect transistor (FET) (e.g., a metal-oxide semiconductor field-effect transistor (MOSFET)).

In some examples, the switching devices 108 may include two power switches and two synchronous rectifiers. In such examples, one or both synchronous rectifiers may include a MOSFET (e.g. a gallium-nitride (GaN) MOSFET). The MOSFET allows for bi-directional current flow due to its intrinsic body diode. As a result, the MOSFET may facilitate a negative surge current when the negative surge voltage is applied.

Figure 2:
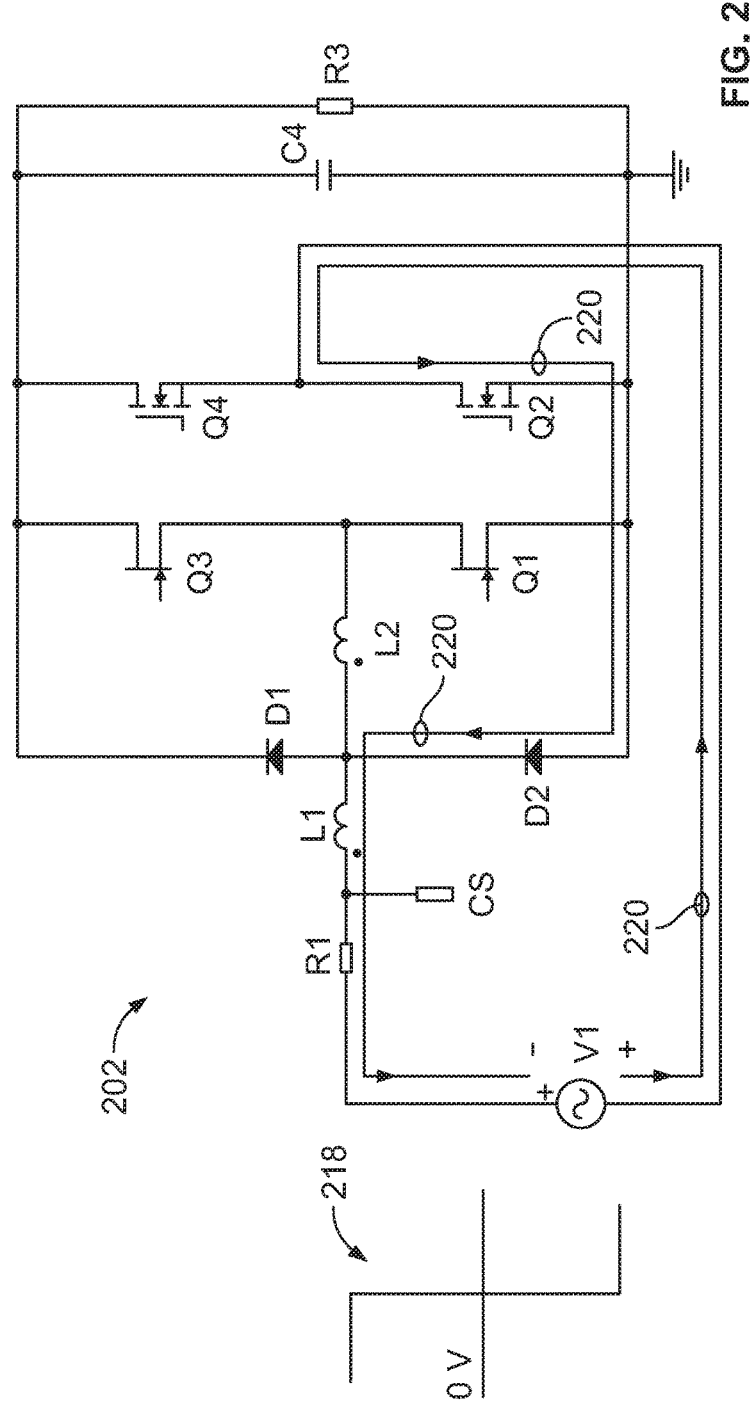
FIG. 2 is a circuit schematic of a totem pole bridgeless PFC power converter including bypass diodes, an inductor on the input side of the bypass diodes and another inductor on the output side of the bypass diodes, according to another example embodiment.

For example, FIG. 2 illustrates a totem pole bridgeless PFC AC-DC power converter 202 including four switching devices Q1-Q4. The switching devices Q1, Q3 are FETs functioning as boost power switches in the power converter 202, and the switching devices Q2, Q4 are MOSFETS functioning as synchronous rectifiers.

As shown in FIG. 2, the power converter 202 further includes two diodes D1, D2 coupled to the switching devices Q1-Q4, an inductor L2 coupled between the diodes D1, D2 and the switching devices Q1-Q4, an inductor L1 coupled to the diodes D1, D2, a DC output, and an AC power source V1. The DC output is shown as a capacitor C4 and a resistor R3 coupled in parallel with the capacitor C4.

The inductors L1, L2 are coupled on opposing sides of a diode bridge (e.g., a diode bypass) formed by the diodes D1, D2. For example, the inductor L1 is coupled on an input side of the diodes D1, D2 and the inductor L2 is coupled on an output side of the diodes D1, D2. The bypass diodes D1, D2 are employed to bypass inrush current during, for example, startup of the power converter 202 when the switching devices Q1-Q4 are off. As such, the inrush current will pass through the bypass diodes D1, D2 (instead of the intrinsic body diodes of the switching devices Q3-Q4) and the capacitor C4 to charge the capacitor C4.

As shown in FIG. 2, the diode D1 is coupled between the boost FET Q3 and the inductor L2, and the diode D2 is coupled between the FET Q3 and the inductor L2. Specifically, a cathode electrode of the diode D1 is coupled to a drain electrode of the FET Q3 and a drain electrode of the MOSFET Q4, and an anode electrode of the diode D1 is coupled to a cathode electrode of the diode D2, an electrode of the inductor L1 and an electrode of the inductor L2. The drain electrodes of the FET Q3 and the MOSFET Q4 are coupled together. An anode electrode of the diode D2 is coupled to a source electrode of the boost FET Q1 and a source electrode of the MOSFET Q2. The source electrodes of the FET Q1 and the MOSFET Q2 are coupled together. The source electrode of the FET Q3 is coupled to the drain electrode of the FET Q1, and a source electrode of the MOSFET Q4 is coupled to a drain electrode of the MOSFET Q2.

The inductor L2 is coupled between the FETs Q1, Q3 and between the diodes D1, D2. Specifically, and as shown in FIG. 2, one electrode of the inductor L2 is coupled between the anode electrode of the diode D1 and the cathode electrode of the diode D2, and another electrode of the inductor L2 is coupled between a source electrode of the FET Q3 and a drain electrode of the FET Q1.

The AC power source V1 is coupled across the diode bridge and the synchronous rectifiers. Specifically, one electrode of the AC power source V1 is coupled between the diodes D1, D2 via the inductor L1 and another electrode of the AC power source V1 is coupled between the MOSFETs Q2, Q4.

When the input AC voltage is supplying a positive voltage, the MOSFET Q2 (e.g., a low frequency synchronous rectifier) is controlled to turn on and the MOSFET Q4 (e.g., a low frequency synchronous rectifier) is controlled to turn off. The FET Q1 is controlled to turn on during a portion of this positive line cycle to allow current to pass through the inductors L1, L2, the FET Q1, and the MOSFET Q2. At other portions of this positive line cycle, the FET Q3 is controlled to turn on. During this time, current passes through the inductors L1, L2, the FET Q3, the DC output and the MOSFET Q2.

During a negative line cycle of the input AC voltage, the MOSFET Q4 is controlled to turn on and the MOSFET Q2 is controlled to turn off. The FET Q3 is controlled to turn on during a portion of this negative line cycle to allow current to pass through the MOSFET Q4, the FET Q3 and the inductors L1, L2. At other portions of this negative line cycle, the FET Q1 is controlled to turn on. During this time, current passes through the MOSFET Q4, the DC output, the FET Q1 and the inductors L1, L2.

As explained above, a negative surge voltage (e.g., voltage 218) may be applied to the input of the of the power converter 202. In such cases, a large amount of negative surge current flows through the power converter 202, as indicated by the line 220. For example, during a portion of the positive line cycle (when the MOSFET Q2 is on), the negative surge current may flow from the AC input source V1, through the MOSFET Q2, the diode D2 and the inductor L1, and back to the AC input source V1, as shown by line 220. In some examples, the negative surge voltage may be about 500V, and the surge current may reach about 500 A. During this time, the inductor L1 may suppress the negative surge current to reduce stress and deterioration of the MOSFET Q2, as explained above. Alternatively, during other portions of the line cycle, the negative surge current may take another path through the power converter 202 (including the inductor L1).

As shown in FIG. 2, the power converter 202 includes a current sensor for sensing current following in the converter. Specifically, the current sensor is coupled in series between the AC power source V1 and the inductor L1 for sensing current flowing through the inductor L1. The sensed current is provided to a control circuit (not shown) such as a digital signal processor (DSP) via a current signal CS. The control circuit may then control one or more of the FETs Q1, Q3 and MOSFETS Q2, Q4 (e.g., with a current control loop) in response to the current signal CS, as explained above. This allows the control circuit to perform cycle by cycle current protection for the power converter 202.

In the example of FIG. 2, the current sensor is a current sense resistor R1. Alternatively, another current sensor may be employed including, for example, a Hall Effect current sensor, a current sense transformer, etc. if higher precision, less power loss, etc. is desired. For example, FIG. 3 illustrates a totem pole bridgeless PFC AC-DC power converter 302 including a Hall Effect current sensor HALL (instead of the current sense resistor R1 of FIG. 2) coupled in series between the inductor L1 and the AC power source V1.

Figure 3:
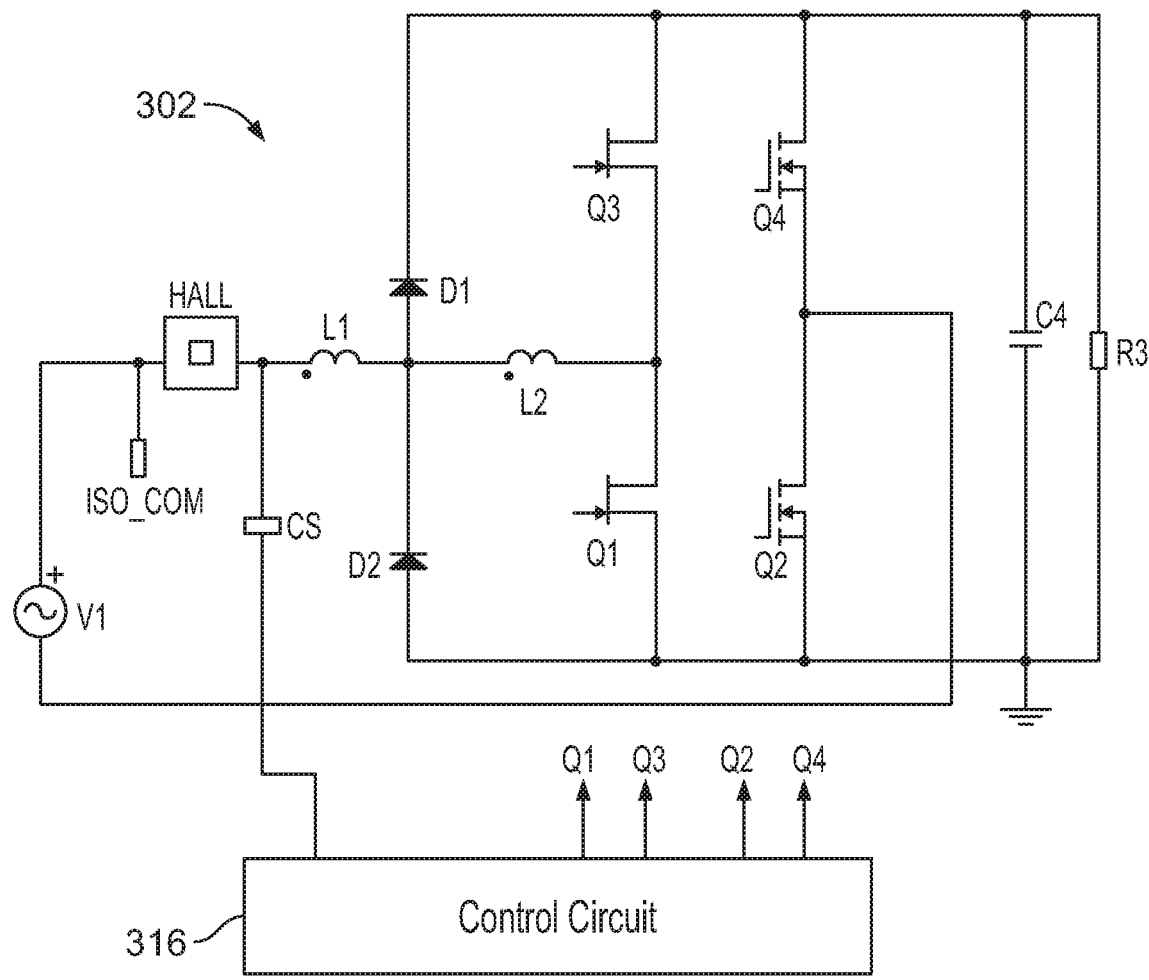
FIG. 3 is a circuit schematic of the totem pole bridgeless PFC power converter of FIG. 2 but including a Hall Effect current sensor and a control circuit, according to yet another example embodiment.

As shown in FIG. 3, the power converter 302 includes a control circuit 316 for controlling the FETs Q1, Q3 and the MOSFETS Q2, Q4. For example, the control circuit 316 receives a current signal CS from the Hall Effect current sensor HALL and controls one or more of the FETs Q1, Q3 and MOSFETS Q2, Q4 in response to the signal CS, as explained above.

Additionally, the power converter 302 may generate another signal ISO_COM representing a sensed parameter in the power converter 302. For example, the signal ISO_COM may represent an AC input current or voltage of the PFC power converter 302. In such examples, the signal ISO_COM may be used to vary a parameter (e.g., the duty cycle, etc.) of the control signals provided to the boost FETs Q1, Q3 for correcting a power factor. This signal ISO_COM may be provided to the control circuit 316 (e.g., an isolated communication (ISOCOMM) interface in the control circuit 316) and/or another control circuit (e.g., a system control circuit of a power supply including the power converter 302).

Referring to FIGS. 2 and 3, the inductors L1, L2 function as the PFC inductance in the power converters 202, 302. The inductors L1, L2 may be considered split inductors, with the inductor L1 having an inductance less than an inductance of the inductor L2. For example, the inductance of the inductor L1 may be eight microhenries (8 μH), ten microhenries (10 μH), etc., and the inductance of the inductor L2 may be three hundred microhenries (300 μH), three hundred and two microhenries (302 μH), etc.

Figure 4:
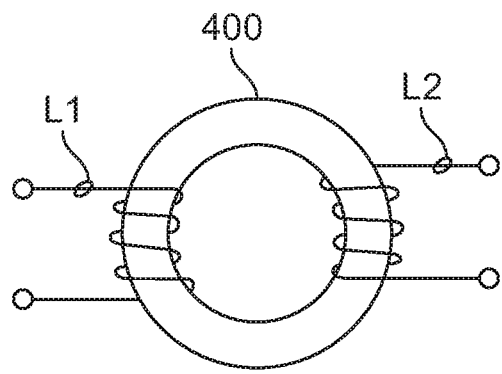
FIG. 4 is a block diagram of the inductors of FIGS. 2 and 3 wound on a toroidal-shaped core according to another example embodiment.

The inductors L1, L2 of FIGS. 2 and 3 may be wound on one or more cores. The inductor cores may be electrically (and in some examples physically) coupled to a power circuit board supporting the other components of the power converter. In some embodiments, the inductors L1, L2 are wound on the same core. For example, FIG. 4 illustrates a toroidal-shaped core 400 including the inductors L1, L2 wound on opposing sides of the core. Alternatively, the inductors L1, L2 may be wound on another suitable shape core. For example, the inductors L1, L2 may be wound on a core having a U-shaped core section and an I-shaped core section. In other embodiments, the inductors L1, L2 may be wound on separate cores.

Figure 5:
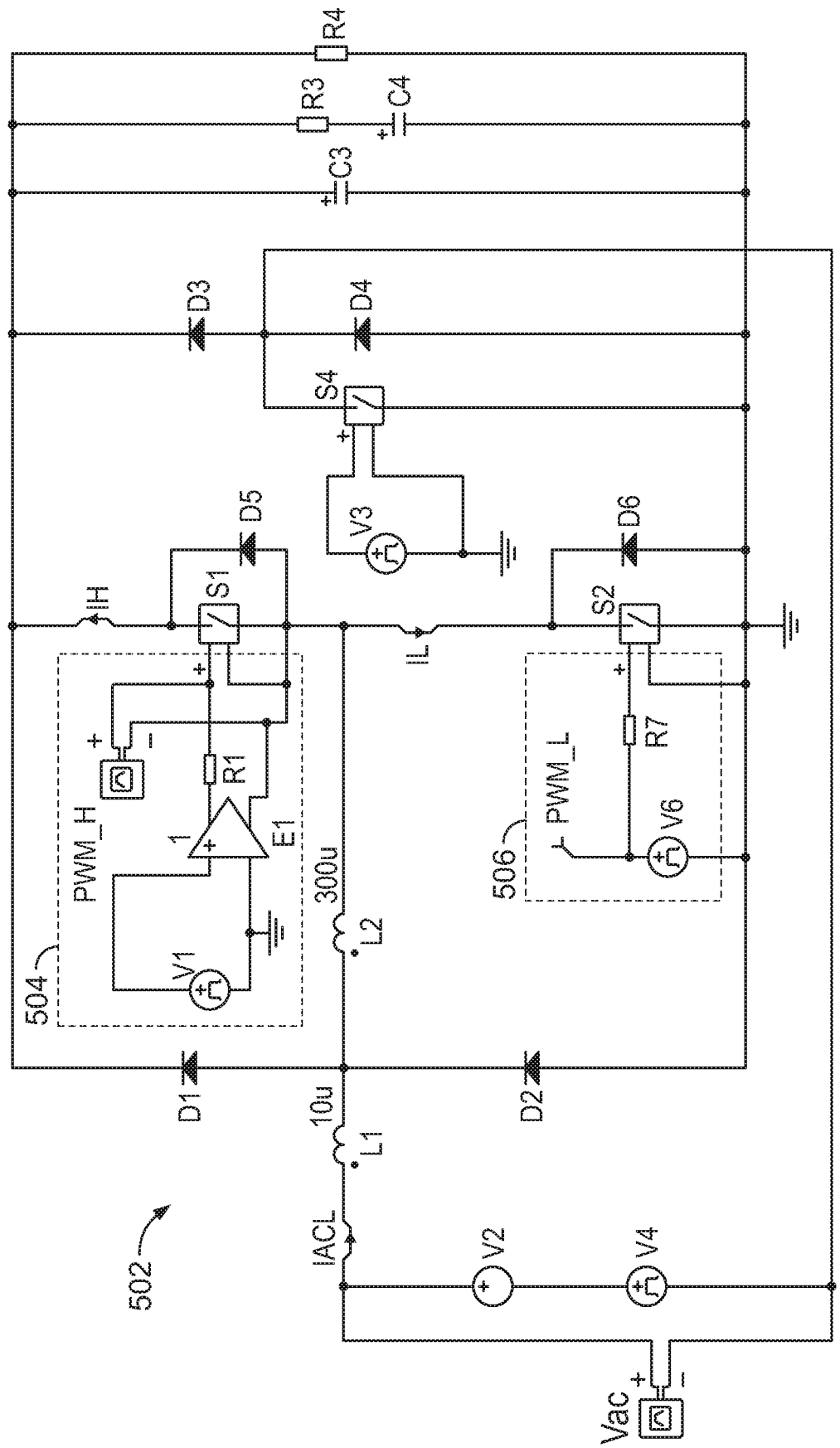
FIG. 5 is a circuit schematic of a totem pole bridgeless PFC power converter including split inductors and bypass diodes, in which the power converter experiences a negative surge voltage according to yet another example embodiment.

FIG. 5 illustrates a totem pole bridgeless PFC AC-DC power converter 502 including the diodes D1, D2 and the split inductors L1, L2 of FIGS. 2 and 3, four switching devices, an AC input source Vac, an output filter capacitor C3, and an output. The output is represented by capacitor C4 (having an equivalent series resistance R3) and a resistor R4 coupled in the parallel with the capacitor C4. As shown in FIG. 5, the switching devices includes two power switches S1, S2 and two synchronous rectifiers D3, S4. The synchronous rectifier S4 may be a MOSFET having an intrinsic body diode represented by a diode D4. The switching devices of FIG. 5 function substantially similar to the switching devices Q1-Q4 of FIGS. 2 and 3.

In the example of FIG. 5, the inductance of the inductor L1 is ten microhenries (10 μH) and the inductance of the inductor L2 is three hundred microhenries (300 μH). Alternatively, one or both of the inductors L1, L2 may have another suitable inductance.

As shown in FIG. 5, the power converter 502 includes a control circuit for controlling the switches S1, S2, S4. For example, the control circuit includes pulse width modulated (PWM) drivers 504, 506 for controlling the power switches S1, S2, respectively. Specifically, the PWM driver 504 includes a voltage pulse V1, a comparator E1, a resistor R1 and a high PWM signal PWM_H. The PWM driver 506 includes a voltage pulse V6, a resistor R7 and a low PWM signal PWM_L. The control circuit also includes a voltage pulse V3 for controlling the synchronous rectifier S4.

In some examples, the power converter 502 may experience a negative surge voltage, as explained above. This negative surge voltage is shown in FIG. 5 as a voltage pulse V4. For example, the voltage pulse V4 may provide an 8/20 microsecond (μsec) pulse with a 500 volt amplitude. This voltage pulse V4 changes the polarity of the input voltage (shown as voltage V2). During this time, a large amount of negative surge current may begin to flow through the power converter 502 due to the negative surge voltage. However, by employing the inductor L1, this negative surge current may be suppressed thereby reducing stress and deterioration of the synchronous rectifier S4, as explained above.

For example, FIGS. 6 and 7 illustrate graphs 600, 700 showing voltage and current characteristics of a power converter experiencing a surge voltage. Specifically, the graph 600 of FIG. 6 shows the voltage and current characteristics of the power converter 502 of FIG. 5 (including the split inductors L1, L2), and the graph 700 of FIG. 7 shows the voltage and current characteristics of a power converter including one PFC inductor (e.g., not including split inductors as disclosed herein).

As shown in FIGS. 6 and 7, the input voltage of the power converters drops to about −400 volts due to a negative surge voltage (e.g., the voltage pulse V4 of FIG. 5). During this time, the inductor L1 suppresses a main line surge current (IACL) flowing through the power converter 502. For example, and as shown in FIG. 6, the inductor L1 causes the main line surge current (IACL) to decay to about 400 A. In contrast, and as shown in FIG. 7, the main line surge current (IACL) flowing through the power converter without the split inductors surges to over 350 kA.

The control circuits disclosed herein may include an analog control circuit, a digital control circuit (e.g., a digital signal controller (DSC), a DSP, etc.), or a hybrid control circuit (e.g., a digital control unit and an analog circuit). Additionally, the entire control circuit, some of the control circuit, or none of the control circuit may be positioned on an integrated circuit. Further, any one of the control circuits may be a portion of another control circuit (e.g., a portion of the power supply's control circuit), or may be a distinct control circuit.

In some embodiments, the totem pole bridgeless PFC power converters disclosed herein may be operated in a continuous-conduction mode. For example, the PFC power converters each may include a control circuit to generate one or more control signals for controlling switching devices so that the PFC power converter is operated in a continuous-conduction mode. In such examples, current flowing through the split inductors (e.g., inductors 112, 114, L1, L2) is continuous and therefore does not fall to zero.

The PFC power converters may be used in various power supplies. These power supplies may include one or more additional power converters (e.g., DC-DC power converters, DC-AC power converters, etc. having any suitable topology). The power supplies may be designed for high power (e.g., greater than 1.0 kW). In some examples, any one of the PFC power converters may be employed in a 3.0 kW AC-DC power supply.

By employing any one of the features disclosed herein, increased current passing through a totem pole bridgeless PFC power converter (e.g., caused by a negative surge current) may be suppressed. Additionally, control of switching devices in the power converter may be quickly altered in response to this increased current. As a result, stress and deterioration on the switching devices and/or other components in the power converter due to high current may be reduced as compared to a conventional totem pole bridgeless PFC power converter.

Further, the power converters disclosed herein may employ less components and a simpler circuit design than conventional totem pole bridgeless PFC power converters. As such, costs (e.g., component costs, manufacturing costs, etc.) and power loss may be reduced in the power converters as compared to conventional totem pole bridgeless PFC power converters.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An electric power supply comprising:
a totem pole bridgeless PFC power converter including:
an AC input for coupling to an AC power source to receive a voltage, the AC input comprising a first AC input and a second AC input;
a DC output comprising a first DC output and a second DC output;
a first pair of switching devices comprising a first switching device and a second switching device serially coupled with the first switching device at a first node, wherein the first switching device is coupled to the first DC output and the second switching device is coupled to the second DC output;
a second pair of switching devices comprising a third switching device and a fourth switching device serially coupled with the third switching device at a second node, wherein the third switching device is coupled to the first DC output and the fourth switching device is coupled to the second DC output;
a pair of diodes comprising a first diode and a second diode serially coupled with the first diode at a third node, wherein the first diode is coupled to the first DC output and the second diode is coupled to the second DC output;
a first inductor coupled between the second node and the third node; and
a second inductor coupled between the third node and the first AC input;
wherein the first node is coupled to the second AC input; and
a control circuit coupled to the PFC power converter, the control circuit configured to generate one or more control signals for controlling one or more of the first, second, third, and fourth switching devices.

2. The electric power supply of claim 1 further comprising a current sensor coupled in series with the second inductor for sensing the current flowing through the second inductor.

3. The electric power supply of claim 1 wherein the PFC power converter includes a core and wherein the first inductor and the second inductor are wound on the core.

4. The electric power supply of claim 3 wherein the core includes a toroidal-shaped core.

5. The electric power supply of claim 1 wherein at least one of the first, second, third, and fourth switching devices includes a diode.

6. The electric power supply of claim 1 wherein at least one of the first, second, third, and fourth switching devices includes a power switch.

7. The electric power supply of claim 1 wherein at least two of the first, second, third, and fourth switching devices switching devices include synchronous rectifiers.

8. The electric power supply of claim 1 wherein the control circuit is configured to generate the one or more control signals for controlling the one or more of the first, second, third, and fourth switching devices to operate the PFC power converter in a continuous-conduction mode.

9. The electric power supply of claim 1 further comprising the AC power source, wherein the AC power source comprises first electrode coupled to the first AC input and a second electrode coupled to the second AC input.

10. The electric power supply of claim 1 wherein the PFC power converter includes a core and wherein the first inductor and the second inductor are wound on the core.

11. The electric power supply of claim 10 wherein the control circuit is configured to generate the one or more control signals for controlling the one or more of the first, second, third, and fourth switching devices to operate the PFC power converter in a continuous-conduction mode.

12. The electric power supply of claim 11 further comprising a current sensor coupled in series with the second inductor for sensing the current flowing through the second inductor.

13. The electric power supply of claim 2 wherein the control circuit is configured to generate the one or more control signals for controlling the one or more of the first, second, third, and fourth switching devices to operate the PFC power converter in a continuous-conduction mode.

14. The electric power supply of claim 13 further comprising an AC power source including a first electrode coupled to the first AC input and a second electrode coupled to the second AC input.

15. The electric power supply of claim 1 wherein the PFC power converter includes a core and wherein the first inductor and the second inductor are wound on the core.

\* \* \* \* \*